US009508072B2

(12) United States Patent
Granbery

(10) Patent No.: US 9,508,072 B2
(45) Date of Patent: Nov. 29, 2016

(54) SECURE PAYMENT INSTRUCTION SYSTEM

(75) Inventor: John Hastings Granbery, Boston, MA (US)

(73) Assignee: PayPal, Inc., San Jose, CA (US)

( * ) Notice: Subject to any disclaimer, the term of this patent is extended or adjusted under 35 U.S.C. 154(b) by 464 days.

(21) Appl. No.: 13/218,586

(22) Filed: Aug. 26, 2011

(65) Prior Publication Data
US 2013/0054459 A1 Feb. 28, 2013

(51) Int. Cl.
*G06Q 20/00* (2012.01)
*G06Q 20/38* (2012.01)
*G06Q 20/12* (2012.01)

(52) U.S. Cl.
CPC ............ *G06Q 20/382* (2013.01); *G06Q 20/12* (2013.01)

(58) Field of Classification Search
CPC ...................................... G06Q 20/12
USPC ............................ 705/64, 65, 67
See application file for complete search history.

(56) References Cited

U.S. PATENT DOCUMENTS

| 6,360,254 | B1 | 3/2002 | Linden et al. |
| 6,839,689 | B2 * | 1/2005 | Aieta ................... G06Q 50/188 705/51 |
| 7,343,351 | B1 * | 3/2008 | Bishop et al. .................. 705/67 |
| 7,386,518 | B2 * | 6/2008 | Cordery ................. G06Q 20/02 705/66 |
| 7,571,140 | B2 * | 8/2009 | Weichert ............... G06Q 20/102 705/40 |
| 7,966,259 | B1 * | 6/2011 | Bui ................................. 705/50 |
| 8,296,323 | B2 * | 10/2012 | Pollard ......................... 707/784 |
| 8,326,770 | B1 * | 12/2012 | Weisman ............... G06Q 30/04 705/319 |
| 8,386,327 | B2 * | 2/2013 | Blackhurst ........ G06Q 30/0641 705/26.1 |
| 8,478,652 | B2 * | 7/2013 | Tuchman ............... G06Q 30/02 705/26.1 |
| 9,069,869 | B1 * | 6/2015 | Quinn ............... G06F 17/30887 |
| 9,324,098 | B1 * | 4/2016 | Agrawal ............... G06Q 30/04 |
| 2003/0120554 | A1 * | 6/2003 | Hogan ................... G06Q 20/02 705/64 |
| 2003/0165240 | A1 * | 9/2003 | Bantz et al. .................... 380/54 |
| 2003/0225695 | A1 | 12/2003 | Park et al. |
| 2003/0229595 | A1 * | 12/2003 | Mononen et al. .............. 705/63 |
| 2004/0254891 | A1 * | 12/2004 | Blinn et al. ..................... 705/67 |
| 2005/0007612 | A1 | 1/2005 | Bourret |
| 2005/0256802 | A1 * | 11/2005 | Ammermann et al. ........ 705/44 |

(Continued)

FOREIGN PATENT DOCUMENTS

| CN | 101950403 A | 1/2011 |
| WO | WO 02/05231 A2 | 1/2002 |

OTHER PUBLICATIONS

Schneier, "Applied Cryptography", Wiley & Sons, Inc., 1996.*

(Continued)

*Primary Examiner* — Steven Kim
(74) *Attorney, Agent, or Firm* — Haynes and Boone, LLP

(57) ABSTRACT

A method for providing secure payment instructions includes verifying a payer device for use in a transaction with a payee device. When a request is received from the payee device for payer information associated with a payment account being used by the payer device in the transaction, a security font is generated and associating in a database at least one payer information font character with payer information that is associated with the payer account. The at least one payer information font character is then provided to the payee device, and when a request for the security font is received and determined to be from the verified payer device, the security font is provided to the verified payer device such that the at least one payer information font character may be converted to the payer information for display on the payer device.

20 Claims, 10 Drawing Sheets

(56) References Cited

U.S. PATENT DOCUMENTS

| | | |
|---|---|---|
| 2007/0250920 A1 | 10/2007 | Lindsay |
| 2008/0229230 A1* | 9/2008 | Grigoriev et al. ............ 715/780 |
| 2008/0249951 A1 | 10/2008 | Gilder et al. |
| 2009/0271250 A1* | 10/2009 | Sriver et al. .................... 705/10 |
| 2009/0299878 A1* | 12/2009 | Keresman et al. ............. 705/27 |
| 2010/0153265 A1* | 6/2010 | Hershfield et al. ............. 705/40 |
| 2010/0188710 A1* | 7/2010 | Fan .................... H04N 1/32149 358/3.28 |
| 2010/0299212 A1* | 11/2010 | Graylin et al. ............ 705/14.66 |
| 2012/0036042 A1* | 2/2012 | Graylin ................. G06Q 20/32 705/26.41 |
| 2013/0124285 A1* | 5/2013 | Pravetz et al. ............. 705/14.23 |

OTHER PUBLICATIONS

PCT International Search Report, Application No. PCT/US2012/31280 mailed Jul. 6, 2012.

Murray G: "Asynchronous JavaScript Technology and XML With Java 2 Platform, Enterprise Edition", Internet Citation, Jun. 9, 2005.

Wikipedia: "Ajax (Programmierung)", Wikipedia.

Wikipedia:"Tokenization (data security)", Wikipedia.

Chinese Office Action and Search Report issued in CN Application No. 201280041696.1, Jul. 4, 2016, 8 pages.

* cited by examiner

SECURE PAYMENT INSTRUCTION SYSTEM

BACKGROUND

1. Field of the Disclosure

The present disclosure generally relates to online and/or mobile payments and more particularly to a secure payment instruction system for online and/or mobile payments.

2. Related Art

More and more consumers are purchasing items and services over electronic networks such as, for example, the Internet. Consumers routinely purchase products and services from merchants and individuals alike. The transactions may take place directly between a conventional or online merchant or retailer and the consumer, and payment is typically made by entering credit card or other financial information. Transactions may also take place with the aid of an online or mobile payment service provider such as, for example, PayPal, Inc. of San Jose, Calif. Such payment service providers can make transactions easier and safer for the parties involved. Purchasing with the assistance of a payment service provider from the convenience of virtually anywhere using a mobile device is one main reason why on-line and mobile purchases are growing very quickly.

Purchasing from an online merchant with the assistance of a payment service provider includes a payer selecting goods and/or service for purchase and then performing a checkout process to provide payment for those goods and/or service. The checkout process typically requires personal information such as, for example, a payer name, a payer shipping address, a payer payment account, and/or a variety of other payer information known in the art, be provided by the payer as instructions to the payment service provider to make the payment. The need to provide such information raises a number of issues, as the online merchant may not be a trusted entity or the online merchant system may have been compromised such that any payer information sent to the online merchant is at risk.

Conventionally, the use of a payment service provider in the checkout process requires that the payer be redirected from the online merchant website to a payment service provider website in order to ensure that payer information is not put at risk. The payer will typically request to use the payment service provider to complete the checkout process, and the payer will then be redirected from the merchant website to the payment service provider website such that the payer information may be securely provided and displayed for selection in order to provide instructions for the payment to the online merchant. Such conventional checkout processes protect the payer information by ensuring that the payer information is only sent between the payment service provider and the payer. However, many online merchants would prefer to host the entire checkout process at their online merchant website, as it provides the online merchant with more control over the shopping experience of the payer, allows the online merchant to take advantage of upsell opportunities, and is less confusing to the payer.

Thus, there is a need for an improved secure payment instruction system.

SUMMARY

According to one embodiment, a method for providing secure payment instructions includes a payment service provider device verifying a payer device for use in a transaction with a payee device. The verification may be performed by receiving payer credentials or detecting a cookie on the payer device. A request for payer information associated with a payer account is then received by the payment service provider device from the payee device, and a security font is generated to create at least one payer information font character that is associated with the payer information. The at least one payer information font character may then be provided by the payment service provider device to the payee device, and the payee device may then provide the payer device with a payee webpage that includes the at least one payer information font character. When provided the payee webpage, the verified payer device requests the security font from the payment service provider device, and that security font is used by the payer device to convert the at least one payer information font character to the payer information for display on the payer device. The payer device may then be used to select the payer information to send instructions to the payment service provider device to process the payment.

In an embodiment, the payment service provider device may also create a plurality of payment confirmation font characters from the security font and associate them with a plurality of payment confirmation section areas, one of which includes a pay button. The plurality of payment confirmation font characters are then provided to the payee device, and the payee device may then provide the payer device a payee webpage that includes the plurality of payment confirmation font characters in a payment confirmation section. When provided the payee webpage, the verified payer device requests the security font from the payment service provider device, and that security font is used by the payer device to convert the plurality of payment confirmation font characters to the payment confirmation section for display on the payer device. The payer device may then be used to select the payment confirmation section area that includes the pay button in order to confirm payment to the payee device.

As a result, a payer may provide a payment (e.g., by completing a checkout process) at a payee website while payer information that is displayed on the payer device through the payee website remains secure, as without access to the security font, the payer information font characters and the payment confirmation font characters are unreadable or nonsensical.

These and other features and advantages of the present disclosure will be more readily apparent from the detailed description of the embodiments set forth below taken in conjunction with the accompanying figures.

Figure 1:
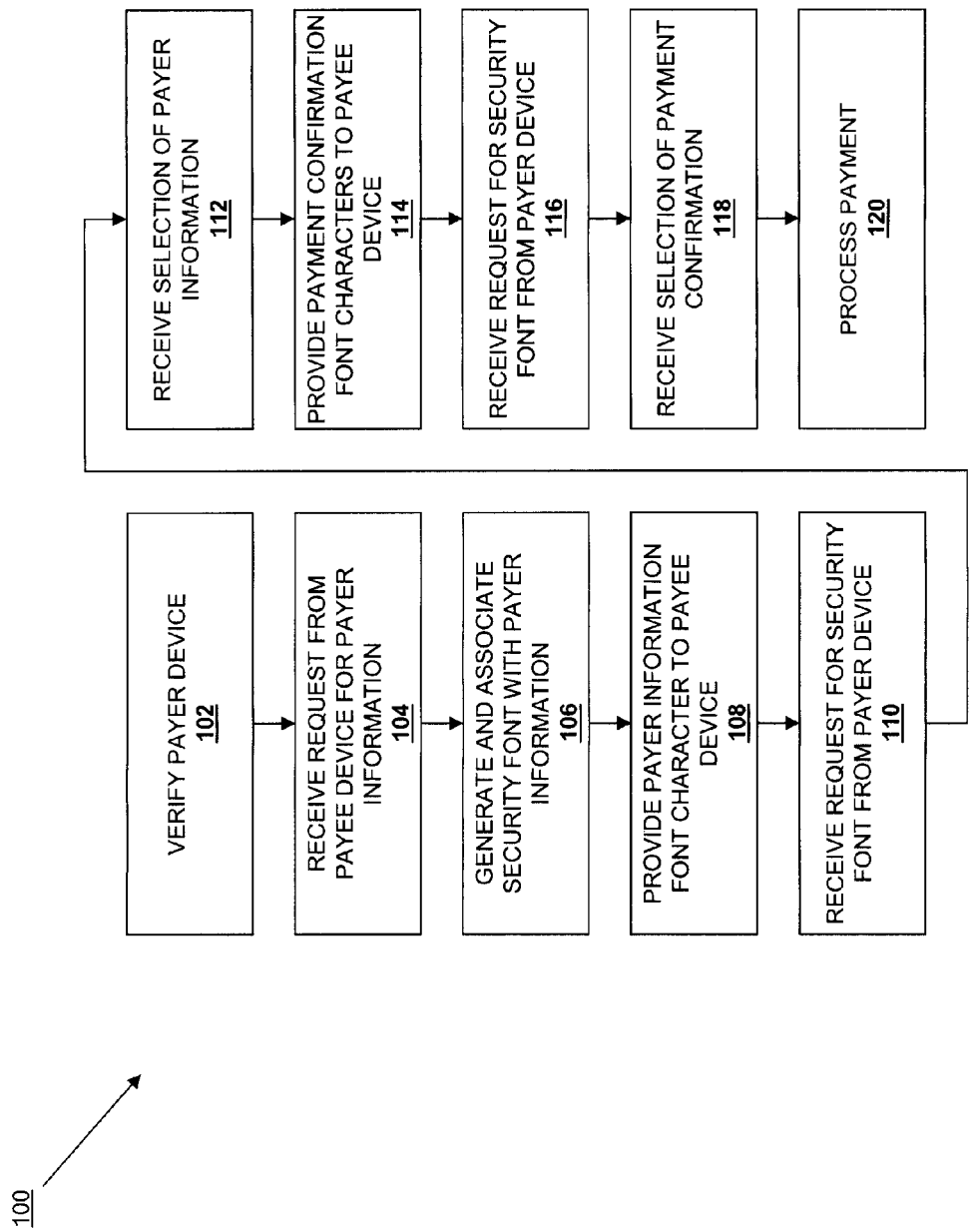
FIG. 1 is a flow chart illustrating an embodiment of a method for providing secure payment instructions.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure provides a system and method for providing secure payment instructions using payer information that is displayed on a payer device through a payee website over a network. A payment service provider device verifies the payer device in response to the payer device beginning a transaction checkout process with the payee device. The payee device then requests payer information for a payer account being used in the transaction, and the payment service provider device provides the payee device with at least one payer information font character that is associated with the payer information and that was created using a security font generated and stored by the payment service provider device. The payee device may then provide a payee webpage on the payee website that includes the at least one payer information font character. The at least one payer information font character may be converted into readable payer information using the security font, which is only retrievable over the network from the payment service provider device by the verified payer device. Once converted, the at least one payer information font character is readable by a user of the payer device, and may be used to select payment instructions to send to the payment service provider. The system and method allow a payee website to provide a checkout process that requires sensitive payer information, while ensuring that such sensitive information remains secure and readable only by the user of the payer device.

Figure 2:
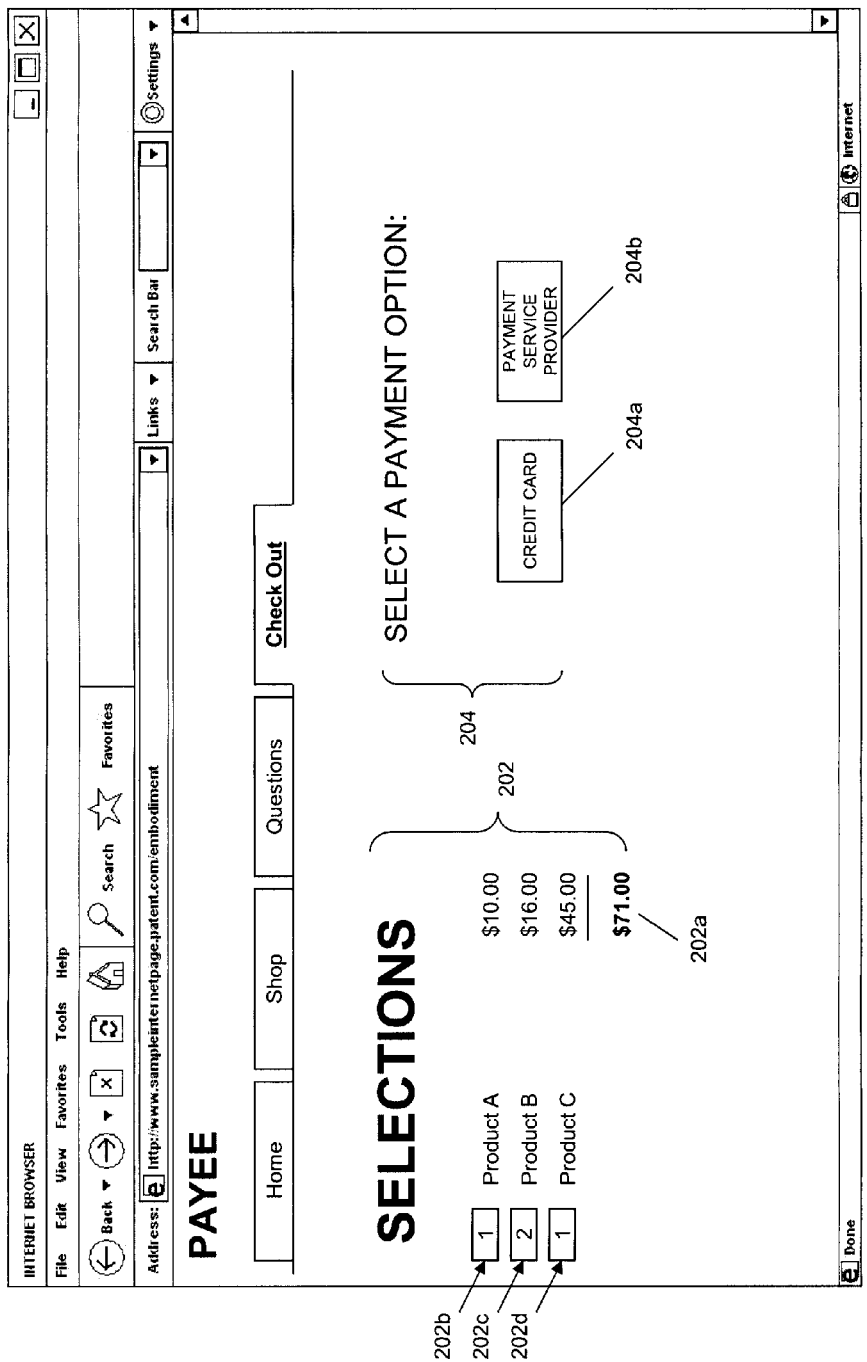
FIG. 2 is a screen shot illustrating an embodiment of a payee checkout webpage for selecting payment options.
Figure 3:
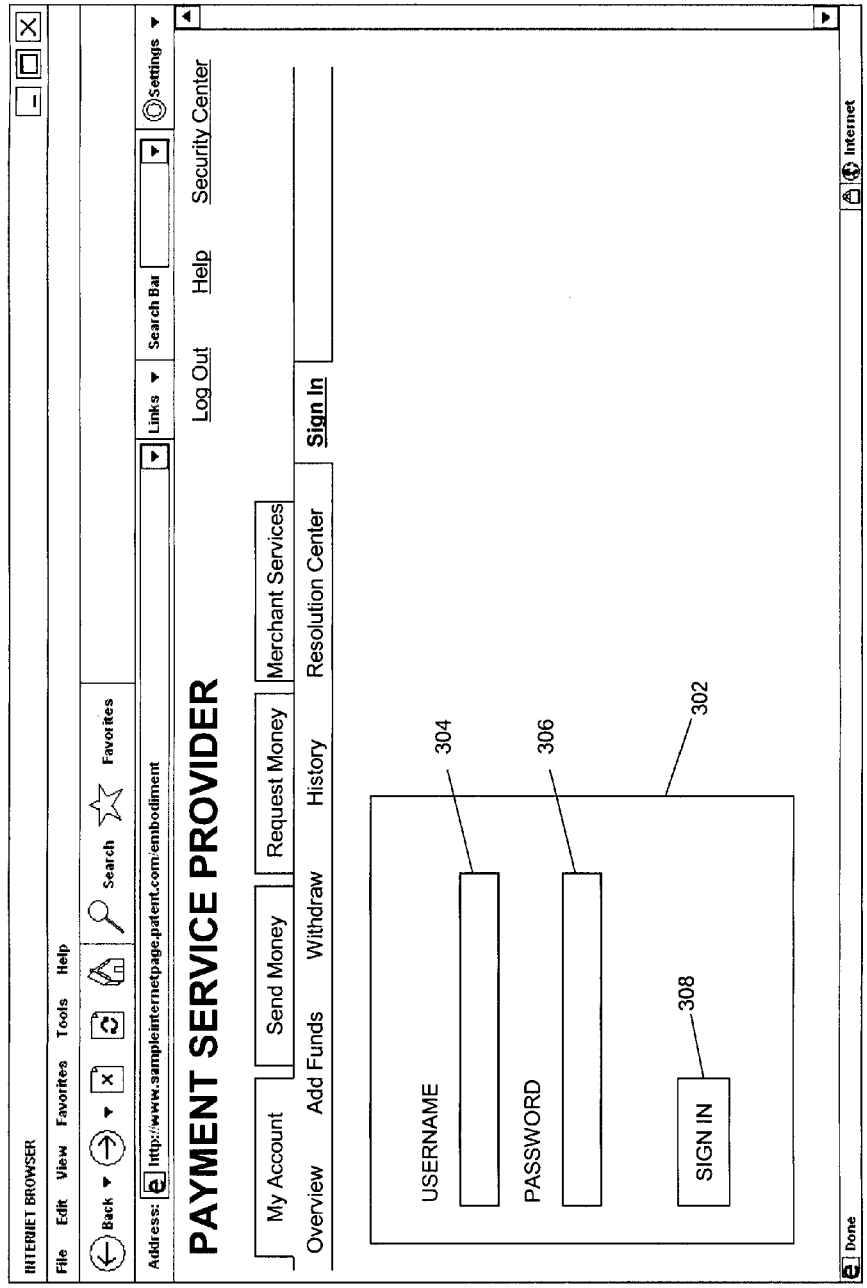
FIG. 3 is a screen shot illustrating an embodiment of a payment service provider login webpage.

Referring now to FIGS. 1, 2, and 3, a method 100 for providing secure payment instructions is illustrated. The method 100 begins at block 102 where a payer device is verified. In an embodiment, a payer device (e.g., operated by a consumer) is connected to a payee device (e.g., operated by a merchant) over a network (e.g., the Internet) to purchase goods and/or services displayed at a payee website, as is known in the art. After the desired goods and/or services are selected, a checkout webpage 200, illustrated in FIG. 2, may be provided by the payee device over the network to be displayed on the payer device. The checkout webpage 200 includes a selected items section 202 (e.g., a "shopping cart") and a payment options section 204. The selected items section 202 includes a plurality of products 202*a*, 202*b*, and 202*c* that were selected from the payee website using the payer device (one of product A for $10.00, two of product B for $16.00, and one of product C for $45.00, for a total purchase amount of $71.00.) The payment options section 204 may include a plurality of payment options, such as a credit card payment option 204*a*, a payment service provider payment option 204*b*, and/or a variety of other payment options known in the art. The payer device may be used to select the payment service provider payment option 204*b* in order to begin a checkout process for the products in the selected items section 202 using a payer account with a payment service provider.

In response to receiving a selection of the payment service provider payment option 204*b*, the payee device begins communicating with a payment service provider device over the network. For example, the payee device may make a server side call to a payment service provider device over the network that indicates the user of the payer device would like to use a payment account with the payment service provider to make a payment for a certain amount (e.g., $71.00 in the illustrated embodiment.) In response, the payment service provider device generates an opaque access token that is sent to the payee device. In an embodiment, the opaque access token is an encrypted payload and/or other credential that the payment service provider is able to decrypt, while all other participants in the system with access to the opaque access token are unable to decrypt the opaque access token but have access to the opaque access token with the ability to send the opaque access token to other participants in the system. The payee device then provides the opaque access token to the payer device and redirects the payer device from the payee website to a payment service provider landing Uniform Resource Locater (URL) on a payment service provider website, such as, for example:
https://start.payservprovider.com/?t=<token>&url=http://www.payee.com/CheckOut/?SESSION=324698

In an embodiment, one of skill in the art will recognize that the URL above may operate to link the payee device, the payer device's secure cookie, and the payment service provider device. The payment service provider device may then detect whether the payer device includes a secure cookie that verifies that a user of the payer device is logged into a payer account with the payment service provider. In an embodiment, the secure cookie may be replaced with some other secure token that the payer device may provide to the payment service provider device without it being known to the payee device (e.g., when used in a non-networked/internet-based system involving physical media.) If the payment service provider device detects the secure cookie, the opaque access token is linked to the payer account associated with the secure cookie on the payer device, and the payer device becomes a verified payer device and is redirected back to the payee website. One of skill in the art will recognize that if the user of the payer device is already logged into their payer account with the payment service provider, selection of the payment service provider payment option 204*b* on the checkout webpage 200 will "bounce" the payer device to the payment service provider website and back (e.g., send the payer device from the payee website, to the payment service provider landing URL, and then quickly back to the payee website). Thus, in many instances, the trip from the merchant website to the payment service provider landing URL and back to the payee website may not be noticed by the user of the payer device (i.e., the user of the payer device will be unaware they have briefly left the payee website).

If the payment service provider device does not detect the secure cookie on the payer device, a login webpage 300 may be provided by the payment service provider device over the network for display on the payer device, as illustrated in FIG. 3. The login webpage 300 includes a login section 302 having a username input 304, a password input 306, and a sign in button 308. As is known in the art, the user of the payer device may provide a username and password in the username input 304 and password input 306, respectively, and then select the sign in button 308 to access or login to a payer account. In response to receiving such payer credentials and verifying that the user of the payer device is logged into a payer account with the payment service provider, the payment service provider device generates and provides a secure cookie to the payer device such that the payer device becomes a verified payer device and is redirected back to the payee website. The payment service provider device may also link the opaque access token to the payer account associated with the generated secure cookie.

In an embodiment, the payment service provider device does a check during the payer device verification of the payer, the payee, the total amount of the payment, and/or a variety of other variables to determine whether to proceed with the method 100. For example, any discrepancies or warning flags may cause the payment service provider device to request other credential information from the user of the payer device to allow access to the payer account for making a payment.

The method 100 then proceeds to block 104 where a request for payer information is received from the payee device. The payee device may request payer information associated with the payer account being used in the transaction. For example, the payee device may request a payer name, one or more payer shipping addresses, and/or one or more payment accounts over the network from the payment service provider device. In an embodiment, the payee device may provide the opaque access token received at block 102 of the method 100 along with the request for payer information. The method 100 then proceeds to block 106 where a security font is generated by the payment service provider device and at least one payer information font character is associated in a database with payer information in the payer account that is being used in the transaction and that was associated with the opaque access token. In an embodiment, the security font maps payer information font characters to vector renderings of the payer information. For example, the payment service provider may generate a font which selects a particular character (or set of characters) for each piece of payer information (e.g., the character "e" may be selected to represent a first name). As understood by one of skill in the art, a font is a mapping of code points (a number that identifies a particular character) to glyphs (a graphical representation of that character, e.g., in vector or bitmap format.) While conventional fonts describe a large number of code points, the security font of the present disclosure may include only glyphs for the code points selected to represent the payer information. Thus, in the example using the character "e" above, 'ë' may be the codepoint U+00EB, and the security font may map U+00EB to a glyph rendering the first name of the payer. In an embodiment, the security font is generated "on-the-fly", e.g., in response to the request by the payee device for the payer information. While the illustrated embodiment discussed below uses Unicode characters as the payer information font characters for ease of reference and description, a variety of unprintable and/or unreadable characters that are mapped to vector renderings of the payer information are envisioned as falling within the scope of the present disclosure.

The method 100 then proceeds to block 108 where the payer information font characters are provided to the payee device. The payment service provider device provides the payer information font characters to the payee device over the network. In one embodiment, payer information font characters may be provided to the payee device using JavaScript Object Notation (JSON). An example of a payer name and two payer payment accounts provided using JSON may include:

```
{
    fullName:
    {
        id: "db31b47ab",
        token: "Ξ",
    },
    payment Accounts:
    [
        {
            id: "322bab2cd197",
            token: " Ђ"
        },
        {
            id: "987aed21f7aaa",
            token: "φ"
        }
    ],
    Css: https://checkout.payservprovider.com/css?id=PAYER
}
```

The payee device may then use the payer information font characters to render a payee webpage. For example, the payee may use the following HyperText Markup Language (HTML) to insert the payer name on the payee webpage:
<div id="db31b47ab">Ξ</div>
While an HTML implementation of the presentation disclosure has been described, this embodiment is provided merely as an example, and one of skill in the art will recognize that any device capable of rendering fonts (e.g., retrieved or received from a server) will fall within the scope of the present disclosure.

In addition, the payee device may add a link to a Cascading Style Sheet (CSS) file provided by the payment service provider device (e.g., embedded in the response from the payment service provider that included the payer information font characters, as discussed above). In an embodiment, the CSS may be in the following form:

```
@font-face
{
    font-family: 'payservproviderPAYER';
    src:
    url('https://checkout.payservprovider.com/font?id=PAYER');
}
#db31b47ab
{
    font-family: payservproviderPAYER
}
```

Figure 4:
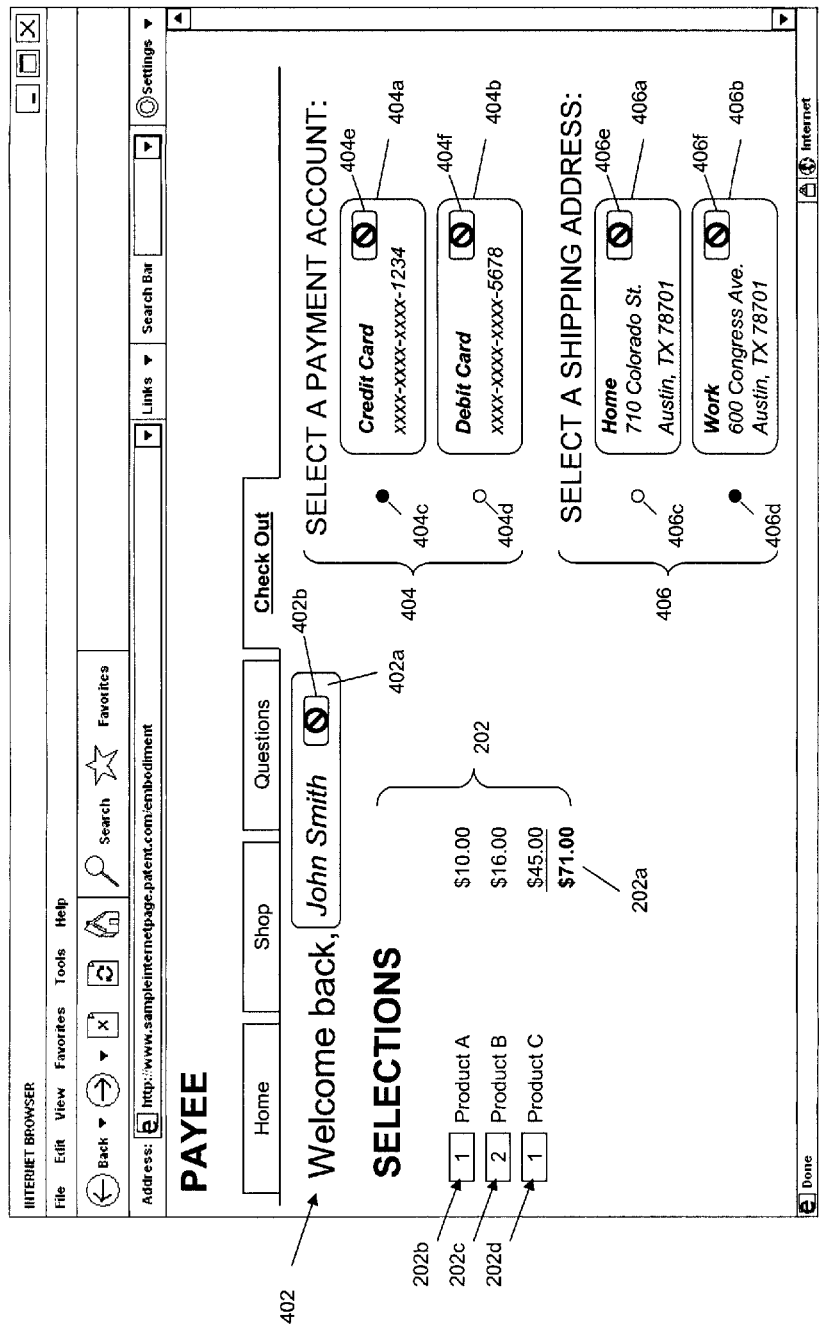
FIG. 4 is a screen shot illustrating an embodiment of a payee checkout webpage for selecting a payment account and a shipping address.

As discussed in more detail below, the CSS sets up the security font that may be loaded from checkout.payservprovider.com, but that will only be served to the payer device that includes the secure cookie that was detected in block 102 of the method 100 or that was generated in response to the payer credentials provided in block 102 of the method 100. Thus, the payee device may provide the payer device with a checkout webpage 400, illustrated in FIG. 4, and at block 110 of the method 100, the payer device will request the security font from the payment service provider device over the network. The checkout webpage 400 includes the selected items section 202, discussed above with reference to the checkout webpage 200 of FIG. 2, along with a payer welcome section 402, a payment option section 404, and a shipping address section 406.

The payer welcome section 402 includes payer information 402a that is a payer information font character that has been converted using the security font such that the payer information 402a is readable on the payer device. In the illustrated embodiment, the payer information font character Ξ has been mapped to the graphic indicated by element number 402a in FIG. 4. As can be seen, the payer information 402a includes a payer name (e.g., "John Smith" in the illustrated embodiment) and a security symbol 402b. The payer welcome section 402 includes the character string "Welcome back," immediately adjacent the payer information 402a, and one of skill in the art will recognize that the payer information font character may be placed anywhere on a webpage provided by the payee device and adjacent any character strings, graphics, and/or other webpage features using, for example, HTML as discussed above, in order to personalize the webpage as desired with the payer information 402a.

As also discussed above, the payer information 402a was sent by the payment service provider device to the payee device as an unreadable or nonsensical payer information font character (e.g., token: "Ξ", in the embodiment discussed above), but when provided to the verified payer device on the checkout webpage 400 along with the URL (https://checkout.payservprovider.com/font?id=PAYER in the embodiment discussed above), the verified payer device is operable to be served the security font from the payment service provider device that converts the unreadable or nonsensical font character (e.g., token: "Ξ", in the embodiment discussed above) to the payer name 402a and security symbol 402b illustrated in FIG. 4 using the mapping for that unreadable or nonsensical payer information font character to the vector renderings of the payer information 402a. One of skill in the art will recognize that common font standards support bitmap rendering in addition to vector rendering, and thus bitmap renderings may be used as well (e.g., to embed a logo or other image.)

In an embodiment, the payer information 402a may include a number of features that were previously selected by the payer account holder. For example, the payer account holder may have selected the border, color, text style, security symbol (or other user selected image such as an image of the user themselves), and/or a variety of other features of the payer information 402a. Thus, the correct rendering of the payer information 402a lets the user of the payer device know that the payer information 402a is being provided by the payment service provider. In an embodiment, the security symbol may be a security symbol provided by the payment service provider device that indicates to the user of the payer device that the payer information has been provided by the payment service provider. For example, the security symbol may include the name of the payment service provider, a trademark of the payment service provider, and/or a variety of other security symbols known in the art that let the user of the payer device know that the payer information 402a is protected by the payment service provider.

The payment option section 404 includes payer information 404a and 404b that are payer information font characters that have been converted using the security font such that the payer information 404a and 404b is readable on the payer device. As can be seen, the payer information 404a includes a first payment option (e.g., a credit card payment option in the illustrated embodiment) with a security symbol 404e and a second payment option (e.g., the debit card payment option in the illustrated embodiment) with a security symbol 404f. The payer option section 404 includes the character string "SELECT A PAYMENT OPTION:" immediately above the payer information 404a and 404b, and selection inputs 404c and 404d adjacent the payer information 404a and 404b, respectively. One of skill in the art will recognize that the payer information font characters may be placed anywhere on a webpage provided by the payee device and adjacent any character strings, graphics, and/or other webpage features using, for example, the HTML as discussed above, in order to personalize the webpage as desired with the payer information 404a and 404b. Similarly as discussed above for the payer information 402a, the payer information 404a and 404b was sent by the payment service provider device to the payee device as an unreadable or nonsensical payer information font character (e.g., token: " Ђ " and "φ" in the embodiment discussed above), provided on the checkout webpage 400 by the payee device (e.g., using HTML), and converted by the verified payer device (e.g., using a URL to access the security font at the payment service provider device) to be displayed in the user-readable form illustrated in FIG. 4. The security features of the payer information 404a and 404b selected by the payer account holder and/or provided by the payment service provider may be substantially similar to those discussed for the payer information 402a above.

The shipping address section 406 includes payer information 406a and 406b that are payer information font characters that have been converted using the security font such that the payer information 406a and 406b is readable on the payer device. As can be seen, the payer information 406a includes a first shipping address (e.g., a home shipping address in the illustrated embodiment) with a security symbol 406e and a second shipping address (e.g., the work shipping address in the illustrated embodiment) with a security symbol 406f. The shipping address section 406 includes the character string "SELECT A SHIPPING ADDRESS:" immediately above the payer information 406a and 406b, and selection inputs 406c and 406d adjacent the payer information 406a and 406b, respectively, and one of skill in the art will recognize that the payer information font characters may be placed anywhere on a webpage provided by the payee device and adjacent any character strings, graphics, and/or other webpage features using, for example, the HTML as discussed above, in order to personalize the webpage as desired with the payer information 406a and 406b. Similarly as discussed above for the payer information 402a, the payer information 406a and 406b was sent by the payment service provider device to the payee device as an unreadable or nonsensical payer information font character, provided on the checkout webpage 400 by the payee device, and converted by the verified payer device to be displayed in the user-readable form illustrated in FIG. 4. The security features of the payer information 406a and 406b selected by the payer account holder and/or provided by the payment service provider may be substantially similar to those discussed for the payer information 402a above.

Thus, the payer device displays a checkout webpage 400 that includes sensitive payer information (e.g., a payer name, payment accounts, and addresses) that is only readable on the verified payer device using the security font (which may only be retrieved from the payment service provider device by the payer device once the payer device has been verified.) The method 100 then proceeds to block 112 where the payment service provider device receives payer information that was selected using the payer device. In an embodiment, the payer device may be used to select a payment option (e.g., the credit card payment option using the selection input 404c on the checkout webpage 400, as illustrated) and a shipping address (e.g., the shipping address using the selection input 406b on the checkout webpage 400, as illustrated). Those selections are received as selections of the unreadable or nonsensical font characters by the payee device, and the payee device forwards the selected unreadable or nonsensical font characters over the network to the payment service provider device. The payment service provider device may then determine the payer information associated with those selected unreadable or nonsensical font characters.

The method 100 then proceeds to block 114 where payment confirmation font characters are provided to the payee device. The payment confirmation font characters are similar to the payer information font characters discussed above. A security font is generated (or reused after being generated for the payer information font characters) and associated with payment confirmation section areas. In an embodiment, the security font maps payment confirmation font characters to vector renderings of the payment confirmation section areas that make up a payment confirmation section, discussed below. In an embodiment, the security font is generated "on-the-fly", e.g., in response to the receiving the payer information selected using the payer device.

Figure 5:
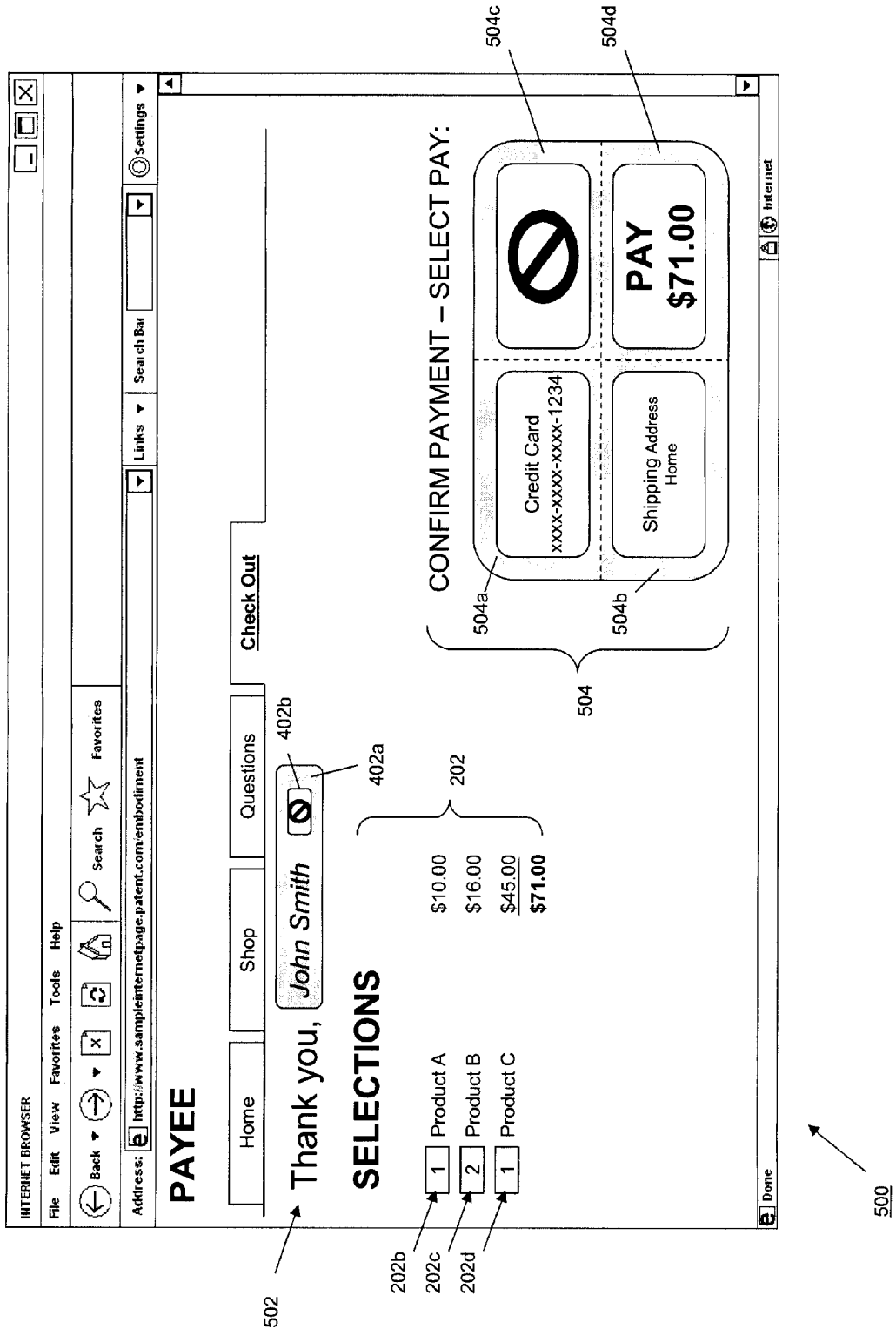
FIG. 5 is a screen shot illustrating an embodiment of a payee checkout webpage for confirming payment to a payee.
Figure 6:
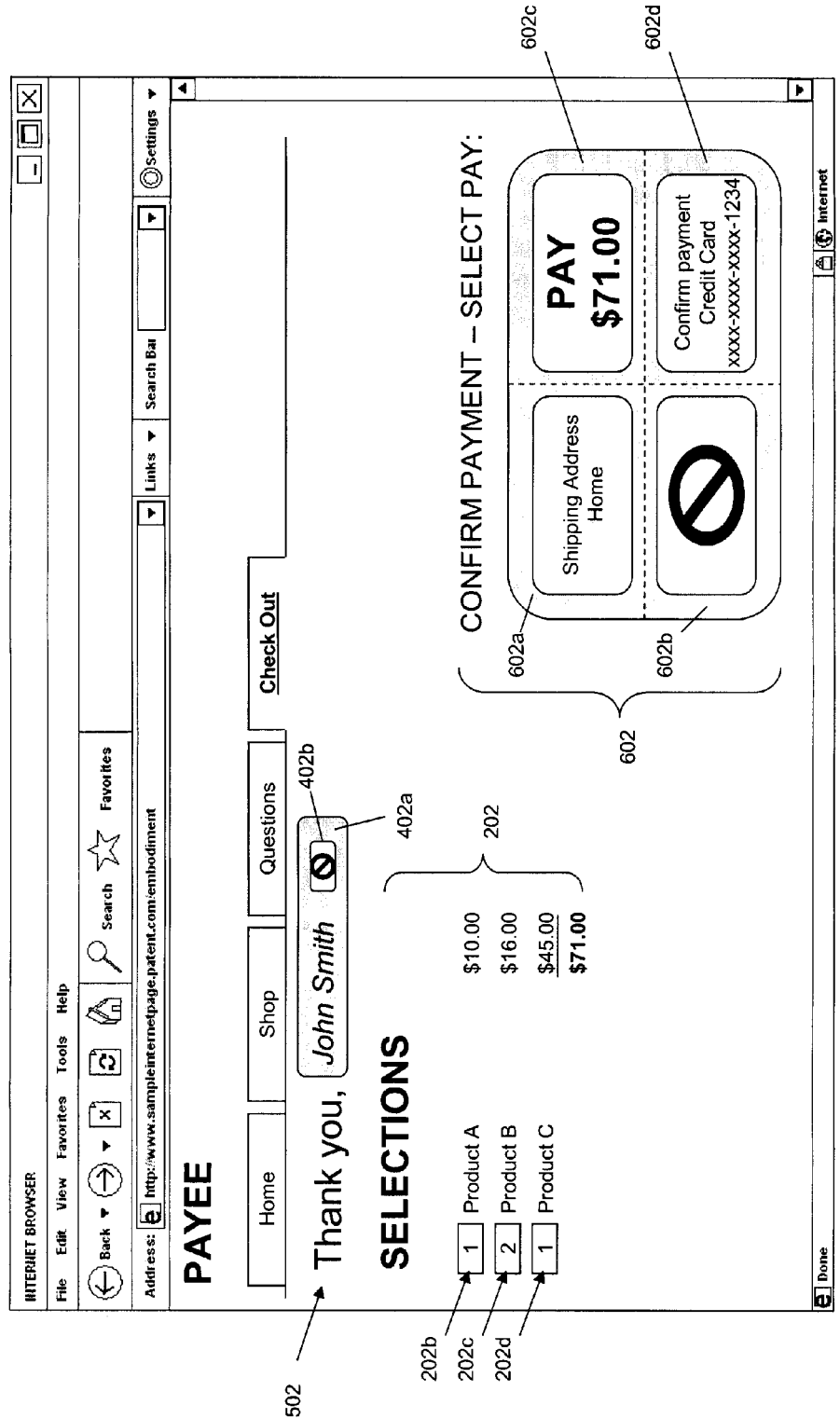
FIG. 6 is a is a screen shot illustrating an alternate embodiment of a payee checkout webpage for confirming payment to a payee.

Thus, the payee device may provide the payer device with a checkout webpage 500, illustrated in FIG. 5, and at block 116 of the method 100, the payer device will request the security font from the payment service provider device. The checkout webpage 500 includes the selected items section 202, discussed above with reference to the checkout webpage 200 of FIG. 2, along with a payer thank you section 502 and a payment confirmation section 504.

The payer thank you section 502 includes payer information 402a discussed above that is a payer information font character that has been converted using the security font such that the payer information 402a is readable on the payer device. As can be seen, the payer information 402a includes the payer name (e.g., "John Smith" in the illustrated embodiment) and the security symbol 402b. The payer thank you section 502 includes the character string "Thank you," immediately adjacent the payer information 402a, and illustrates how the payee device may position the payer information font character anywhere on a webpage provided by the payee device and adjacent any character strings, graphics, and/or other webpage features using, for example, the HTML as discussed above, in order to personalize the webpage as desired with the payer information 402a.

In an embodiment, the payment confirmation section 504 may be provided on the checkout webpage 500 by the payee device using HTML such as, for example:

```
{
    checkout: "<div id=234hjkbs><input id 80u0jj34
        value=23jbf8e/></div><div id 34hb737d><inputid=sjhjh234
        value=wjhj323/></div><div id=jbwe3kj4><input id=wejbejj4
        value=3hg8sd9/></div><div id=f423df4w><input id=dfd944ns
        value=f0f949e/></div>"
}
```

This provides payment confirmation font characters that, in FIG. 5, have been converted into four payment confirmation section areas 504a, 504b, 504c, and 504d using the security font such that the payment confirmation section areas 504a, 504b, 504c, and 504d are readable on the payer device. As can be seen in FIG. 5, the payment confirmation section area 504a includes the payment option selected using the payer device, the payment confirmation section area 504b includes the shipping address selected using the payer device, the payment confirmation section area 504c includes a security symbol, and the payment confirmation section area 504d includes the total amount of the payment. The payment confirmation section 504 also includes the character string "CONFIRM PAYMENT—SELECT PAY:" immediately above the payment confirmation section areas 504a and 504c, and one of skill in the art will recognize that the payment confirmation font characters may be placed anywhere on a webpage provided by the payee device and adjacent any character strings, graphics, and/or other webpage features using, for example, the HTML as discussed above, in order to personalize the webpage as desired with the payment confirmation section. Similarly as discussed above for the payer information 406a, each of the payment confirmation sections area 504a, 504b, 504c, and 504d were sent by the payment service provider device to the payee device as an unreadable or nonsensical payer information font character, provided on the checkout webpage 500 by the payee device, and converted by the verified payer device to be displayed in the user-readable form illustrated in FIG. 5. The security features of the payment confirmation section selected by the payer account holder and/or provided by the payment service provider may be substantially similar to those discussed for the payer information 402a above. In the illustrated embodiment, the payment confirmation section areas 504a, 504b, 504c, and 504d are separated by dashed lines for clarity of discussion. However, in other embodiments, the payment confirmation section may be provided as a single integrated graphic with no dashed lines, but still having individually selectable areas.

The method 100 then proceeds to block 118 where selection of the payment confirmation is received. In an embodiment, the payer device is used to select one of the payment confirmation section areas 504a, 504b, 504c, or 504d (e.g., by "clicking" or selecting one of the payment confirmation section areas 504a, 504b, 504c, or 504d on the checkout webpage 500 using a mouse or other input device). That selection is received as a selection of an unreadable or nonsensical font character by the payee device, and the payee device forwards the selected unreadable or nonsensical font character over the network to the payment service provider device. The payment service provider device may then determine which of the payment confirmation section areas 504a, 504b, 504c, or 504d was selected using the payment device. In the illustrated embodiment, if the selected payment confirmation section area is the payment confirmation section area that was displayed on the payer device and included the total amount of the payment, the payment service provider device determines that the payment is authorized for the payer account associated with the secure cookie detected on or generated and provided to the payer device, and the method 100 proceeds to block 120 where the payment service provider device processes the payment and transfers funds from that payer account to a payee account of the payee. In response to the authorized payment, the payee device may provide a receipt webpage to the payer device over the network. Thus, in the event the user of the payer device is logged into their payer account with the payment service provider, the user of the payer device completes the checkout process (seemingly) without leaving the payee website.

If the selected payment confirmation section area is not the payment confirmation section area that was displayed on the payer device and included the total amount of the payment, the payment service provider device determines that the payment is not authorized for the payer account, and the payment service provider device will not process the payment or transfers funds from the payer account to a payee account of the payee. In an embodiment, in response to determining that the selected payment confirmation section area is not the payment confirmation section area that was displayed on the payer device and included the total amount of the payment, the payment service provider device may provide the payee device with different payment confirmation font characters having a different layout than the payment confirmation section 504 such that the payee device may provide the payer device with a modified checkout webpage 600 to re-attempt to confirm the payment. The checkout webpage 600 includes payment confirmation section 602 having payment confirmation section areas 602a, 602b, 602c, and 602d that are payment confirmation font characters that have been converted using the security font such that the payment confirmation section areas 602a, 602b, 602c, and 602d are readable on the payer device. As can be seen, the payment confirmation section 602 is similar to the payment confirmation section 504 discussed above, but with the layout changed such that the payment confirmation section area 602a includes the shipping address selected using the payer device, the payment confirmation section area 602b includes a security symbol, the payment confirmation section area 602c includes total amount of the payment, and the payment confirmation section area 602d includes the payment option selected using the payer device.

The payment confirmation sections 504 and 602 illustrate how payment confirmation sections may be provided on a website that includes payment confirmation section areas that display different information when their associated payment confirmation font characters are converted on the verified payer device. Thus, if only the payment service provider device and the payer device have access to the security font, the information in the payment confirmation section appears as unreadable or nonsensical font characters to the payee device or any third party that intercepts data sent between the payment service provider device and the payee device or between the payee device and the payer device, but may be displayed as readable and understandable information on the payer device. Furthermore, as the payment service provider device includes a database of the security font mapping of payment confirmation font characters to payment confirmation section areas, the payment service provider device can easily determine whether the payment confirmation section area selected using the payer device is the correct payment confirmation section area for confirming the payment from the payer account.

Figure 7:
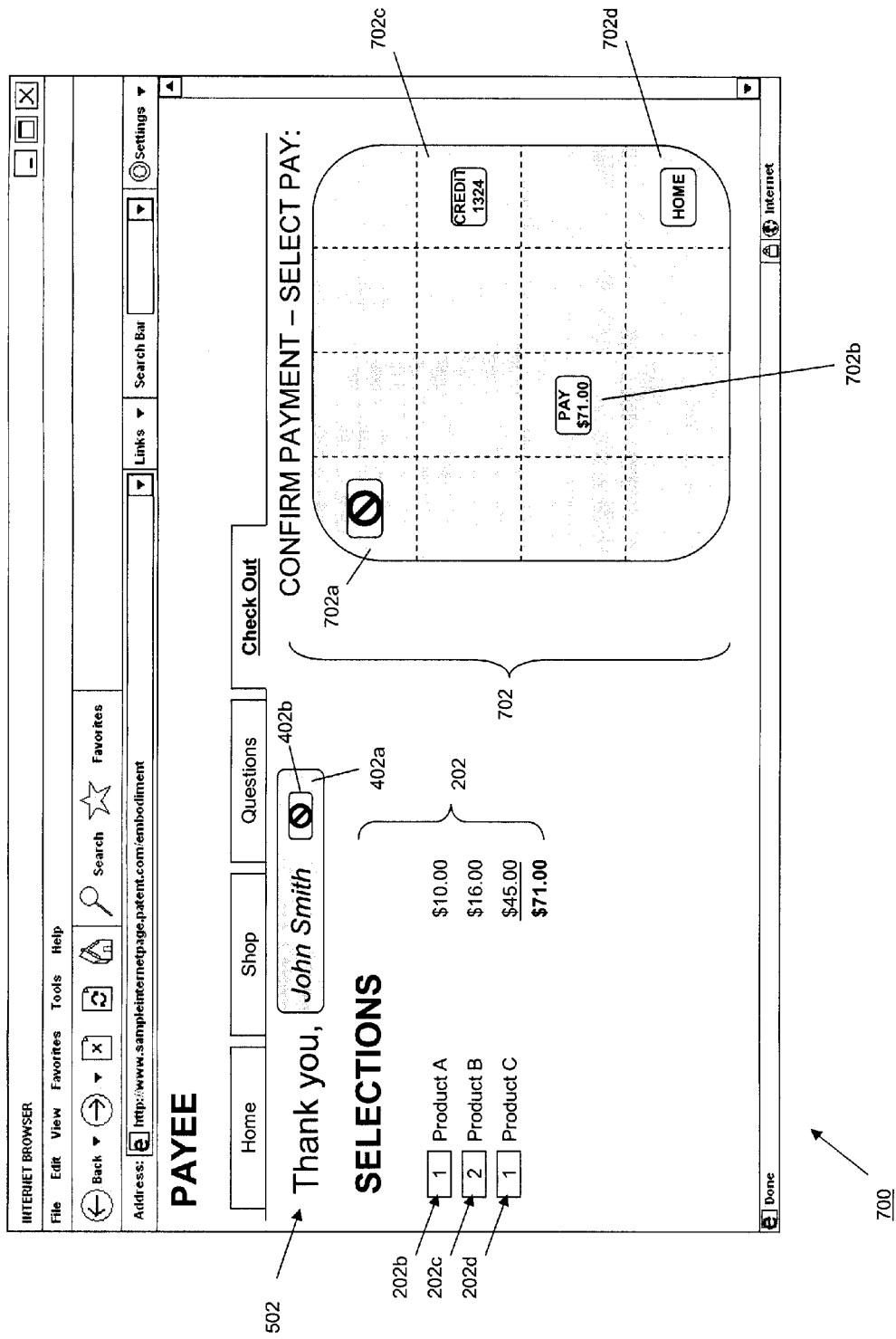
FIG. 7 is a screen shot illustrating an alternate embodiment of a payee checkout webpage for confirming payment to a payee.

Referring now to FIG. 7, a checkout webpage 700 is illustrated that is substantially similar to the checkout webpages 500 and 600 with the provision of a modified payment confirmation section 702 that includes 16 payment confirmation section areas rather than the 4 payment confirmation section areas illustrated and discussed above. The payment confirmation section 702 of FIG. 7 includes 16 payment confirmation font characters that have been converted using the security font such that the payment confirmation section areas 702a, 702b, 702c, and 702d include readable information on the payer device and the remaining payment confirmation section areas are blank. As can be seen, the payment confirmation section 702 is similar to the payment confirmation sections 504 and 602 discussed above, but with payment confirmation section area 702a including a security symbol, the payment confirmation section area 702b including total amount of the payment, the payment confirmation section area 702c including the payment option selected using the payer device, and the payment confirmation section area 702d including the shipping address selected using the payer device. One of skill in the art will recognize that any number of payment confirmation sections areas may be provided in the payment confirmation section to increase security (e.g., by providing more selectable payment confirmation section areas to decrease the chances of guessing which area to select in order to confirm the payment).

In an embodiment, the payment service provider device may monitor the payee device or payee system for incorrect selections of payment confirmation section areas that may indicate fraud. For example, in the event selections of payment confirmation section areas are incorrect more than 1% of the time, the system and method discussed above may be disabled for the payee device. Additionally, in an embodiment, the payment confirmation sections 504, 602, and 702 may only be provided for the total amount of the payment initially provided by the payee device in block 102 of the method 100, and in the event the total amount of the payment changes, the payee device may be required to repeat the checkout process (e.g., by obtaining a new opaque access token).

Thus, a system and method are provided that allow a user of a payer device to complete a payment on a payee website using a payer account with a payment service provider while ensuring that payer information is secure and only displayable in a readable format on the payer device. This allows a payee to control the user experience during the checkout process for a payer using a payer account with a payment service provider, which provides the payee opportunities to upsell and presents a smoother checkout process than is provided in conventional systems that require the payer be redirected to a payment service provider website to provide payment instructions and complete the payment.

Figure 8:
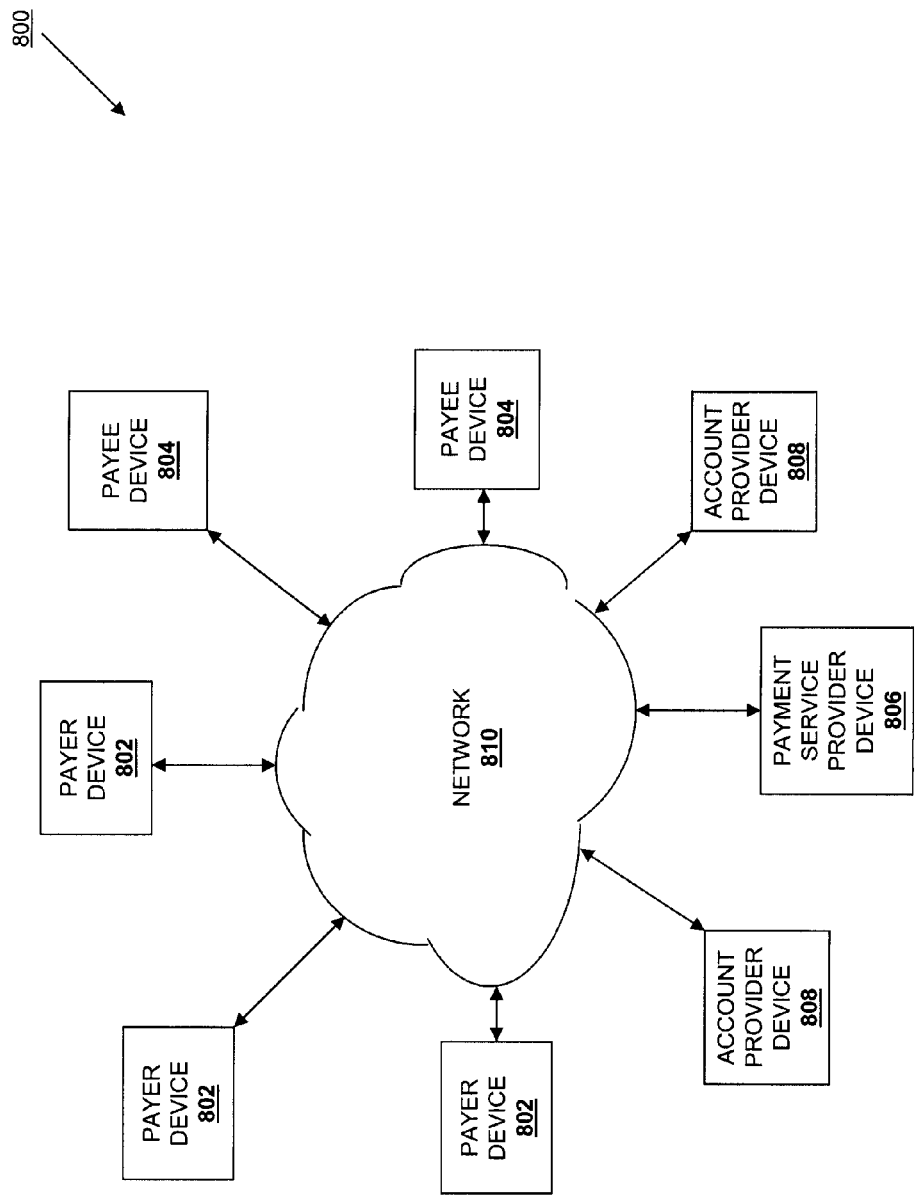
FIG. 8 is a schematic view illustrating an embodiment of a networked system.

Referring now to FIG. 8, an embodiment of a networked system 800 used in the secure payment instruction system described above is illustrated. The networked system 800 includes a plurality of payer devices 802, a plurality of payee devices 804, a payment service provider device 806, and a plurality of account provider devices 808 in communication over a network 810. Any of the payer devices 802 may be the payer device, discussed above. The payee devices 804 may be the payee device discussed above and may be operated by the payee discussed above. The payment service provider device 806 may be the payment service provider devices discussed above and may be operated by a payment service provider such as, for example, PayPal Inc. of San Jose, Calif. The account provider devices 808 may be accessed by the payment service provider device 806 to process a payment from a payer (that has an account with the account provider) to a payee, and may be operated by account providers such as, for example, credit card account providers, bank account providers, savings account providers, and a variety of other account providers known in the art.

The payer devices 802, payee devices 804, payment service provider device 806, and account provider devices 808 may each include one or more processors, memories, and other appropriate components for executing instructions such as program code and/or data stored on one or more computer readable mediums to implement the various applications, data, and steps described herein. For example, such instructions may be stored in one or more computer readable mediums such as memories or data storage devices internal and/or external to various components of the system 800, and/or accessible over the network 810.

The network 810 may be implemented as a single network or a combination of multiple networks. For example, in various embodiments, the network 810 may include the Internet and/or one or more intranets, landline networks, wireless networks, and/or other appropriate types of networks.

The payer device 802 may be implemented using any appropriate combination of hardware and/or software configured for wired and/or wireless communication over network 810. For example, in one embodiment, the payer device 802 may be implemented as a personal computer of a user in communication with the Internet. In other embodiments, the payer device 802 may be a smart phone, personal digital assistant (PDA), laptop computer, and/or other types of computing devices.

The payer device 802 may include one or more browser applications which may be used, for example, to provide a convenient interface to permit the payer to browse information available over the network 810. For example, in one embodiment, the browser application may be implemented as a web browser configured to view information available over the Internet.

The payer device 802 may also include one or more toolbar applications which may be used, for example, to provide user-side processing for performing desired tasks in response to operations selected by the payer. In one embodiment, the toolbar application may display a user interface in connection with the browser application.

The payer device 802 may further include other applications as may be desired in particular embodiments to provide desired features to the payer device 802. In particular, the other applications may include a payment application for payments assisted by a payment service provider through the payment service provider device 806. The other applications may also include security applications for implementing user-side security features, programmatic user applications for interfacing with appropriate application programming interfaces (APIs) over the network 810, or other types of applications. Email and/or text applications may also be included, which allow the payer to send and receive emails and/or text messages through the network 810. The payer device 802 includes one or more user and/or device identifiers which may be implemented, for example, as operating system registry entries, cookies associated with the browser application, identifiers associated with hardware of the payer device 802, or other appropriate identifiers, such as a phone number. In one embodiment, the user identifier may be used by the payment service provider device 806 and/or account provider device 808 to associate the user with a particular account as further described herein.

The payee device 804 may be maintained, for example, by a conventional or on-line merchant, conventional or digital goods seller, individual seller, and/or application developer offering various products and/or services in exchange for payment to be received conventionally or over the network 810. In this regard, the payee device 804 may include a database identifying available products and/or services (e.g., collectively referred to as items) which may be made available for viewing and purchase by the payer.

The payee device 804 also includes a checkout application which may be configured to facilitate the purchase by the payer of items. The checkout application may be configured to accept payment information from the user through the payer device 802, the account provider through the account provider device 808, and/or from the payment service provider through the payment service provider device 806 over the network 810.

Figure 9:
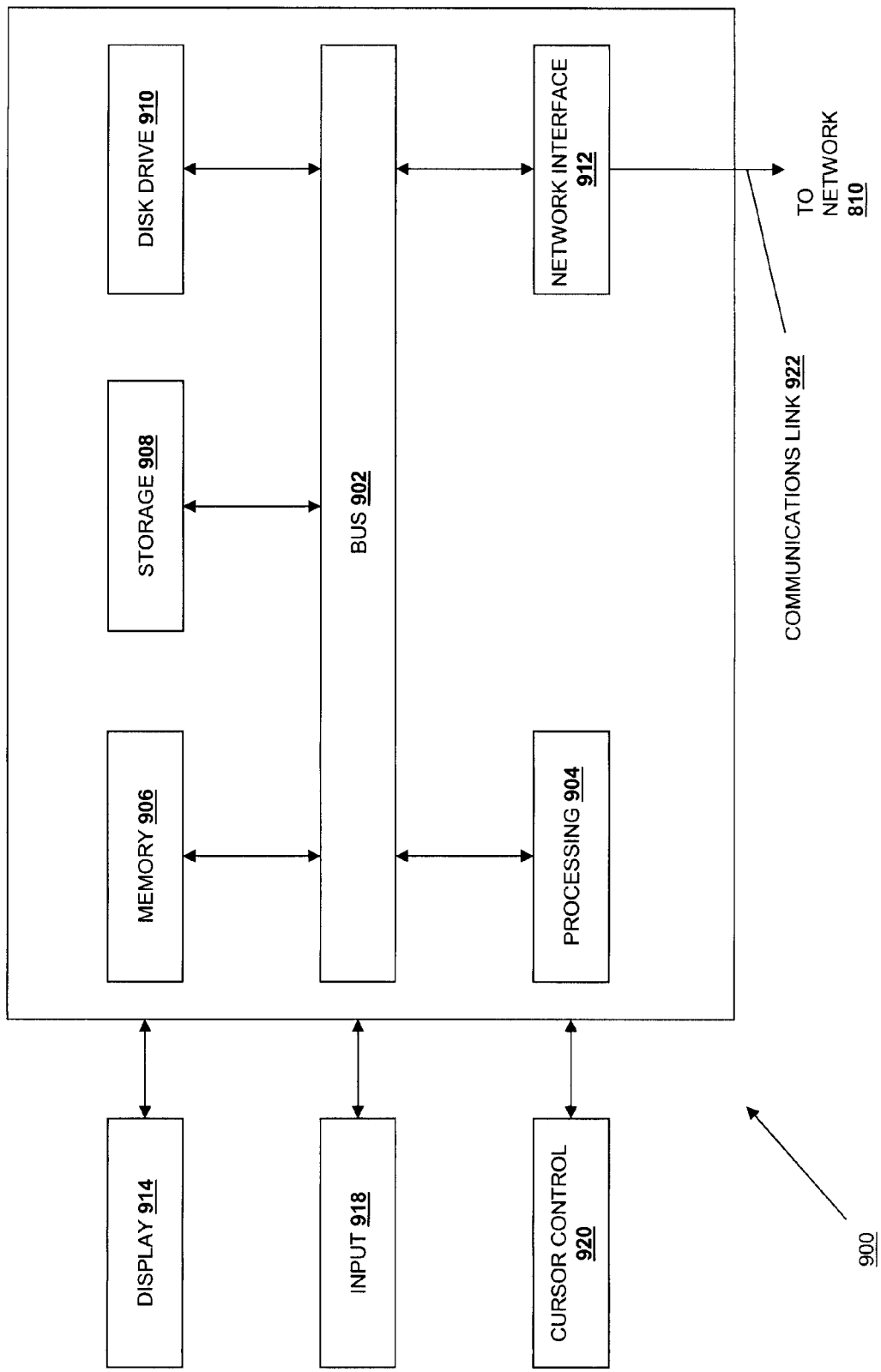
FIG. 9 is a schematic view illustrating an embodiment of a computer system.

Referring now to FIG. 9, an embodiment of a computer system 900 suitable for implementing, for example, the payer devices 802, the payee devices 804, the payment service provider device 806, and/or the account provider devices 808, is illustrated. It should be appreciated that other devices utilized by payer, payees, payment service providers, and account providers in the payment system discussed above may be implemented as the computer system 900 in a manner as follows.

In accordance with various embodiments of the present disclosure, computer system 900, such as a computer and/or a network server, includes a bus 902 or other communication mechanism for communicating information, which interconnects subsystems and components, such as a processing component 904 (e.g., processor, micro-controller, digital signal processor (DSP), etc.), a system memory component 906 (e.g., RAM), a static storage component 908 (e.g., ROM), a disk drive component 910 (e.g., magnetic or optical), a network interface component 912 (e.g., modem or Ethernet card), a display component 914 (e.g., CRT or LCD), an input component 918 (e.g., keyboard, keypad, or virtual keyboard), and/or a cursor control component 920 (e.g., mouse, pointer, or trackball). In one implementation, the disk drive component 910 may comprise a database having one or more disk drive components.

In accordance with embodiments of the present disclosure, the computer system 900 performs specific operations by the processor 904 executing one or more sequences of instructions contained in the memory component 906, such as described herein with respect to the payer devices 802, the payee devices 804, the payment service provider device 806, and/or the account provider devices 808. Such instructions may be read into the system memory component 906 from another computer readable medium, such as the static storage component 908 or the disk drive component 910. In other embodiments, hard-wired circuitry may be used in place of or in combination with software instructions to implement the present disclosure.

Logic may be encoded in a computer readable medium, which may refer to any medium that participates in providing instructions to the processor 904 for execution. Such a medium may take many forms, including but not limited to, non-volatile media, volatile media, and transmission media. In one embodiment, the computer readable medium is non-transitory. In various implementations, non-volatile media includes optical or magnetic disks, such as the disk drive component 910, volatile media includes dynamic memory, such as the system memory component 906, and transmission media includes coaxial cables, copper wire, and fiber optics, including wires that comprise the bus 902. In one example, transmission media may take the form of acoustic or light waves, such as those generated during radio wave and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. In one embodiment, the computer readable media is non-transitory.

In various embodiments of the present disclosure, execution of instruction sequences to practice the present disclosure may be performed by the computer system 900. In various other embodiments of the present disclosure, a plurality of the computer systems 900 coupled by a communication link 924 to the network 810 (e.g., such as a LAN, WLAN, PTSN, and/or various other wired or wireless networks, including telecommunications, mobile, and cellular phone networks) may perform instruction sequences to practice the present disclosure in coordination with one another.

The computer system 900 may transmit and receive messages, data, information and instructions, including one or more programs (i.e., application code) through the communication link 924 and the network interface component 912. The network interface component 912 may include an antenna, either separate or integrated, to enable transmission and reception via the communication link 924. Received program code may be executed by processor 904 as received and/or stored in disk drive component 910 or some other non-volatile storage component for execution.

Figure 10:
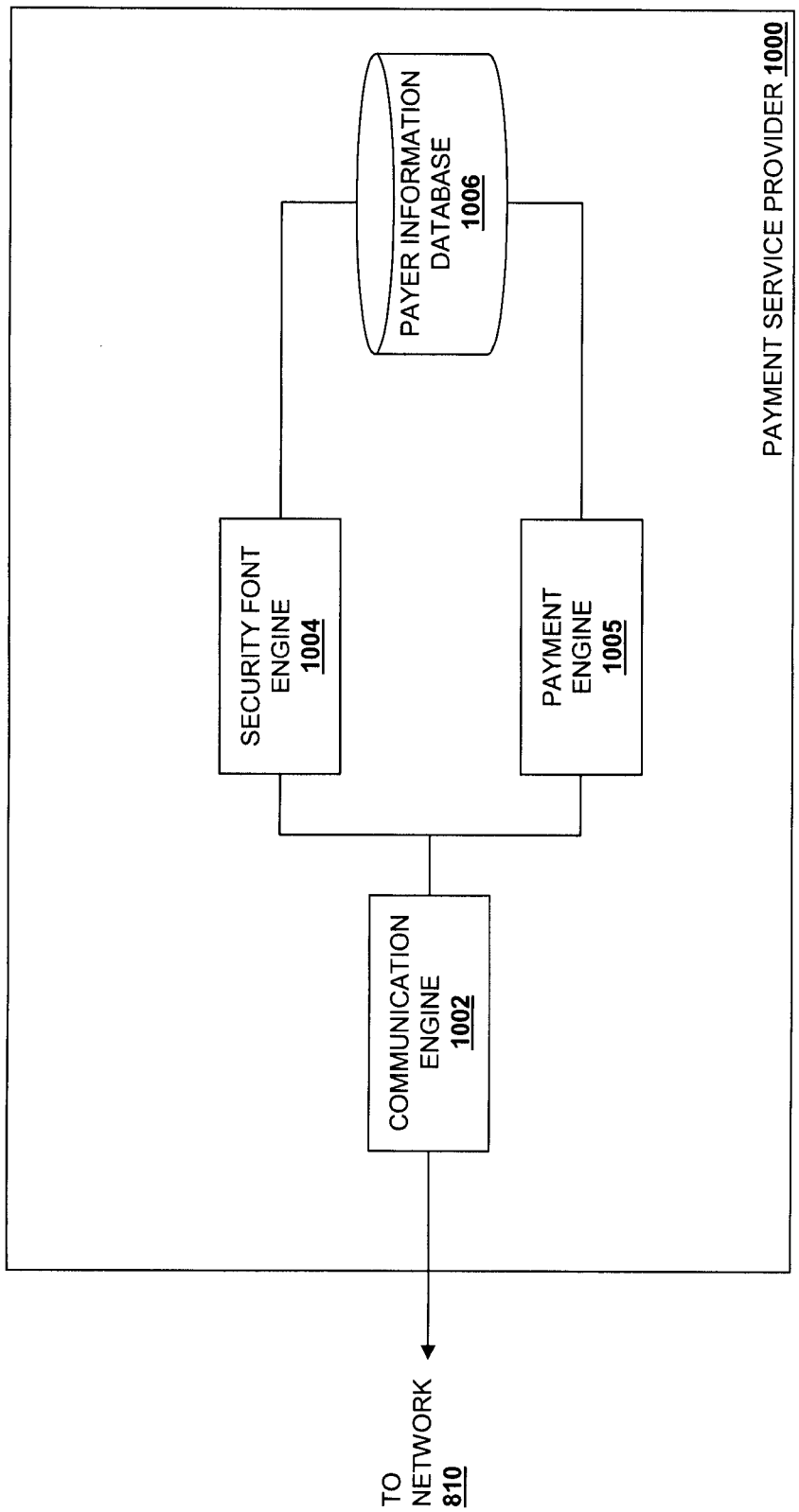
FIG. 10 is a schematic view illustrating an embodiment of a payment service provider device.

Referring now to FIG. 10, an embodiment of a payment service provider device 1000 is illustrated. In an embodiment, the payment service provider device 1000 may be the payment service provider device 806. The payment service provider device 1000 includes a communication engine 1002 that is coupled to the network 810, a security font engine 1004, and a payment engine 1005 that are each coupled to a payer information database 1006. The communication engine 1002 may be software or instructions stored on a computer-readable medium that allows the payment service provider device 1000 to send and receive information over the network 810. The security font engine 1004 may be software or instructions stored on a computer-readable medium that is operable to receive communications sent by the payer device and payee device through the communication engine 1002, generate the security font and associate payer information font characters and payment confirmation font characters with payer information and payment confirmation section areas, respectively, in the database 1006, and decode selected payer information font characters and payment confirmation font characters sent by the payee device to determine payer information and payment confirmation section areas. The payment engine 1005 may be software or instructions stored on a computer-readable medium that is operable to process a payment from a payer account to a payee account using the payment instructions according to the method discussed above. While the database 1006 has been illustrated as located in the payer device 1000, one of skill in the art will recognize that it may be connected to the security font engine 1004 and the payment engine 1005 through the network 810 without departing from the scope of the present disclosure.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on payees and payers; however, a payer or consumer can pay, or otherwise interact with any type of recipient, including charities and individuals. The payment does not have to involve a purchase, but may be a loan, a charitable contribution, a gift, etc. Thus, payee as used herein can also include charities, individuals, and any other entity or person receiving a payment from a payer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method for providing secure payment instructions, comprising:
    identifying, by a payer device to a payee device over a network, a payment provider for a payment transaction, wherein the identifying of the payment provider initiates communication between the payee device and a payment provider device that result in the payment provider device generating a security font, associating payer information in a database with at least one payer information security font character that is only readable as the payer information by converting the at least one payer information security font character to a rendering of the payer information using the security font, and providing the at least one payer information security font character to the payee device;
    verifying, by the payer device with the payment provider device over the network, the payer device for use in the payment transaction;
    accessing, by the payer device via the payee device over the network, a payment page for the payment transaction that includes the at least one payer information security font character;
    sending, by the payer device to the payment provider device over the network, a request for the security font;
    receiving, by the payer device from payment provider device over the network based on the verification of the payer device for use in the payment transaction, the security font; and
    converting, by the payer device using the security font, the at least one payer information security font character included on the payment page to the rendering of the payer information such that the payer information included on the payment page is readable on the payer device.

2. The method of claim 1, wherein the verifying the payer device for use in the payment transaction further includes:
    sending, by payer device to the payment provider device over the network, payer credentials.

3. The method of claim 1, wherein the verifying the payer device for use in the payment transaction further includes:
    providing, by the payer device to payment provider device over the network, access to a cookie on the payer device.

4. The method of claim 1, wherein the security font is associated with a Uniform Resource Location (URL) that is directed to the payment provider device.

5. The method of claim 1, further comprising:
sending, by the payer device to the payment provider device over the network, a selection of the at least one payer information security font character included on the payment page that causes the payment service provider device to process a payment for the payment transaction using the payer information that is associated with the at least one payer information security font character that was selected.

6. The method of claim 1, wherein the identifying of the payment provider initiates the communication between the payee device and the payment provider device that result in the payment provider device associating a plurality of payment confirmation security font characters with a plurality of payment confirmation section areas, and wherein one of the payment confirmation security font characters includes a pay button that is only readable as the pay button in response to converting the one of the payment confirmation security font characters to a rendering of the pay button using the security font, and wherein the method further comprises:
accessing, by the payer device via the payee device over the network, the payment page for the payment transaction that includes the plurality of payment confirmation security font characters; and
converting, by the payer device using the security font, the plurality of payment confirmation security font characters included on the payment page to a payment confirmation section that includes the rendering of the pay button such that the pay button is readable on the payer device.

7. The method of claim 6, further comprising:
sending, by the payer device to the payment provider device over the network, a selection of one of the plurality of payment confirmation security font characters included on the payment page that causes the payment provider device to process the payment for the payment transaction in response to determining that the selected one of the plurality of payment confirmation security font characters is the pay button.

8. A non-transitory, machine-readable medium having stored thereon machine-readable instructions executable to cause a machine to perform operations comprising:
identifying, to a payee device over a network, a payment provider for a payment transaction, wherein the identifying of the payment provider initiates communication between the payee device and a payment provider device that result in the payment provider device generating a security font, associating payer information in a database with at least one payer information security font character that is only readable as the payer information by converting the at least one payer information security font character to a rendering of the payer information using the security font, and providing the at least one payer information security font character to the payee device;
verifying, with the payment provider device over the network, a payer device for use in the payment transaction;
accessing, via the payee device over the network, a payment page for the payment transaction that includes the at least one payer information security font character;
sending, to the payment provider device over the network, a request for the security font;
receiving, from payment provider device over the network based on the verification of the payer device for use in the payment transaction, the security font; and
converting, using the security font, the at least one payer information security font character included on the payment page to the rendering of the payer information such that the payer information included on the payment page is readable on the payer device.

9. The non-transitory, machine-readable medium of claim 8, wherein the verifying the payer device for use in the payment transaction further includes:
sending, to the payment provider device over the network, payer credentials.

10. The non-transitory, machine-readable medium of claim 8, wherein the verifying the payer device for use in the payment transaction further includes:
providing, to payment provider device over the network, access to a cookie on the payer device.

11. The non-transitory, machine-readable medium of claim 8, wherein the security font is associated with a Uniform Resource Location (URL) that is directed to the payment provider device.

12. The non-transitory, machine-readable medium of claim 8, wherein the operations further comprise:
sending, to the payment provider device over the network, a selection of the at least one payer information security font character included on the payment page that causes the payment service provider device to process a payment for the payment transaction using the payer information that is associated with the at least one payer information security font character that was selected.

13. The non-transitory, machine-readable medium of claim 8, wherein the identifying of the payment provider initiates the communication between the payee device and the payment provider device that result in the payment provider device associating a plurality of payment confirmation security font characters with a plurality of payment confirmation section areas, and wherein one of the payment confirmation security font characters includes a pay button that is only readable as the pay button in response to converting the one of the payment confirmation security font characters to a rendering of the pay button using the security font, and wherein the operations further comprise:
accessing, via the payee device over the network, the payment page for the payment transaction that includes the plurality of payment confirmation security font characters; and
converting, using the security font, the plurality of payment confirmation security font characters included on the payment page to a payment confirmation section that includes the rendering of the pay button such that the pay button is readable on the payer device.

14. The non-transitory, machine-readable medium of claim 13, wherein the operations further comprise:
sending, to the payment provider device over the network, a selection of one of the plurality of payment confirmation security font characters included on the payment page that causes the payment provider device to process the payment for the payment transaction in response to determining that the selected one of the plurality of payment confirmation security font characters is the pay button.

15. A secure payment instruction system, comprising:
a non-transitory memory; and
one or more hardware processors coupled to the non-transitory memory and configured to execute instructions from the non-transitory memory to cause the system to perform operations comprising:

identifying, to a payee device over a network, a payment provider for a payment transaction, wherein the identifying of the payment provider initiates communication between the payee device and a payment provider device that result in the payment provider device generating a security font, associating payer information in a database with at least one payer information security font character that is only readable as the payer information by converting the at least one payer information security font character to a rendering of the payer information using the security font, and providing the at least one payer information security font character to the payee device;

verifying, with the payment provider device over the network, a payer device for use in the payment transaction;

accessing, via the payee device over the network, a payment page for the payment transaction that includes the at least one payer information security font character;

sending, to the payment provider device over the network, a request for the security font;

receiving, from payment provider device over the network based on the verification of the payer device for use in the payment transaction, the security font; and converting, using the security font, the at least one payer information security font character included on the payment page to the rendering of the payer information such that the payer information included on the payment page is readable on the payer device.

16. The system of claim 15, wherein the verifying the payer device for use in the payment transaction further includes:

sending, to the payment provider device over the network, payer credentials.

17. The system of claim 15, wherein the verifying the payer device for use in the payment transaction further includes:

providing, to payment provider device over the network, access to a cookie on the payer device.

18. The system of claim 15, wherein the operations further comprise:

sending, to the payment provider device over the network, a selection of the at least one payer information security font character included on the payment page that causes the payment service provider device to process a payment for the payment transaction using the payer information that is associated with the at least one payer information security font character that was selected.

19. The system of claim 15, wherein the identifying of the payment provider initiates the communication between the payee device and the payment provider device that result in the payment provider device associating a plurality of payment confirmation security font characters with a plurality of payment confirmation section areas, and wherein one of the payment confirmation security font characters includes a pay button that is only readable as the pay button in response to converting the one of the payment confirmation security font characters to a rendering of the pay button using the security font, and wherein the operations further comprise:

accessing, via the payee device over the network, the payment page for the payment transaction that includes the plurality of payment confirmation security font characters; and converting, using the security font, the plurality of payment confirmation security font characters included on the payment page to a payment confirmation section that includes the rendering of the pay button such that the pay button is readable on the payer device.

20. The system of claim 19, wherein the operations further comprise:

sending, to the payment provider device over the network, a selection of one of the plurality of payment confirmation security font characters included on the payment page that causes the payment provider device to process the payment for the payment transaction in response to determining that the selected one of the plurality of payment confirmation security font characters is the pay button.

* * * * *